US00RE48847E

(19) United States
(12) Reissued Patent
Isaacs

(10) Patent Number: US RE48,847 E
(45) Date of Reissued Patent: Dec. 7, 2021

(54) POST-PAGE CALLER NAME IDENTIFICATION SYSTEM

(71) Applicant: Greenflight Venture Corporation, West Palm Beach, FL (US)

(72) Inventor: Jeffrey D. Isaacs, Fort Washington, PA (US)

(21) Appl. No.: 15/289,905

(22) Filed: Oct. 10, 2016

Related U.S. Patent Documents

Reissue of:
(64) Patent No.: 8,861,698
Issued: Oct. 14, 2014
Appl. No.: 14/174,724
Filed: Feb. 6, 2014

(51) Int. Cl.
*H04M 1/56* (2006.01)
*H04M 15/06* (2006.01)
*H04M 7/00* (2006.01)
*H04M 3/42* (2006.01)

(52) U.S. Cl.
CPC ..... *H04M 7/0033* (2013.01); *H04M 3/42042* (2013.01); *H04M 2201/38* (2013.01)

(58) Field of Classification Search
CPC ..... H04M 3/42059; H04M 3/42042; H04M 7/0033; H04M 2201/38
USPC ..... 379/142.1, 142.15
See application file for complete search history.

(56) References Cited

U.S. PATENT DOCUMENTS 5,457,738 A * 10/1995 Sylvan ..... 379/93.23
5,903,636 A * 5/1999 Malik ..... H04M 3/42042 379/142.01
6,782,086 B2 * 8/2004 Clapper ..... H04M 1/575 379/142.06
6,954,526 B1 * 10/2005 Glenn ..... H04Q 3/0025 379/207.15
7,308,408 B1 * 12/2007 Stifelman ..... G10L 15/22 704/266
7,839,987 B1 * 11/2010 Kirchhoff ..... H04M 1/575 379/142.02
8,155,287 B2 * 4/2012 Woodring ..... H04M 3/42 379/142.05
8,358,766 B1 * 1/2013 Denenberg ..... H04M 3/42042 379/201.01
8,447,285 B1 * 5/2013 Bladon ..... H04M 3/53341 455/414.4
8,625,762 B1 * 1/2014 White et al. ..... 379/142.06
(Continued)

OTHER PUBLICATIONS

Kessler, "In Apps For Mobile Advertising, Brands Pay You To Listen" fastcompany.com, Sarah Kessler, Aug. 15, 2013, (pp. 1-10) (Hereinafter Kessler).*
3:16-cv-00175-RS *Greenflight Venture Corporation et al.* v. *Whitepages, Inc. et.*, "Order Granting Defendant's Motion for Judgment on the Pleadings," issued on Jul. 25, 2016.
(Continued)

*Primary Examiner* — Ovidio Escalante
(74) *Attorney, Agent, or Firm* — Edward C. Kwok; VLP Law Group, LLP

(57) ABSTRACT

Caller Name Identification, or CNAM Caller ID, is a telecommunication end-user feature that appeared for PSTN landline customers in the late 1980s. The rapid development of cellular mobile and VOIP telephony systems lead to the frequent omission of the CNAM Caller ID feature. Described is an independent end-user system that obtains the CNAM Caller ID after the call page transmission. The system operates on the user's smartphone or on a TCP/IP connected computer. A user with multiple telephone devices (i.e. a smartphone, landline, and VOIP line) may share use of this system between all devices.

4 Claims, 4 Drawing Sheets

(56) References Cited

U.S. PATENT DOCUMENTS

| | | | | |
|---|---|---|---|---|
| 8,644,470 | B2 * | 2/2014 | Gosselin | H04M 3/42042 379/142.06 |
| 8,699,682 | B2 * | 4/2014 | Nguyen | H04Q 3/0016 379/114.03 |
| 9,641,663 | B2 * | 5/2017 | Rincon | H04M 1/72561 |
| 2002/0099720 | A1 * | 7/2002 | Bansal | 707/104.1 |
| 2008/0037764 | A1 * | 2/2008 | Lee | H04M 3/12 379/266.01 |
| 2008/0052372 | A1 * | 2/2008 | Weber | G06F 16/58 709/217 |
| 2008/0147771 | A1 * | 6/2008 | Bertolino | 709/201 |
| 2008/0222144 | A1 * | 9/2008 | Backer et al. | 707/5 |
| 2008/0240383 | A1 * | 10/2008 | Fronczak et al. | 379/88.19 |
| 2009/0158367 | A1 * | 6/2009 | Myers | H04N 21/25833 725/109 |
| 2009/0257575 | A1 * | 10/2009 | Gosselin | H04M 3/42042 379/142.06 |
| 2009/0328118 | A1 * | 12/2009 | Ravishankar et al. | 725/106 |
| 2010/0254524 | A1 * | 10/2010 | Kim | H04Q 3/76 379/201.02 |
| 2011/0013755 | A1 * | 1/2011 | Martino | H04M 1/578 379/88.2 |
| 2011/0081911 | A1 * | 4/2011 | Silver | H04M 5/12 455/445 |
| 2013/0287196 | A1 * | 10/2013 | Zerillo | 379/142.06 |

OTHER PUBLICATIONS

3:16-cv-00175-RS *Greenflight Venture Corporation et al.* v. *Whitepages, Inc. et.*, "Order Denying Applicant's Motion For Reconsideration," issued on Aug. 16, 2016.

Zhang, "The Line Information Database (LIDB) and Wireless Services," Telcordia Technologies, Inc., White Paper Analysis, Dec. 2001.

"OSSGR Section 22.3: Line Information Database," Telcordia, Apr. 2009, Issue 8 (GR-1158).

3:16-cv-00175-RS *Greenflight Venture Corporation et al.* v. *Whitepages, Inc. et.*, "Defendant Whitepages, Inc.'s Reply in Support of Its Motion for Judgment on the Pleadings of Invalidity under 35 USC 101," filed on Jun. 13, 2016.

3:16-cv-00175-RS *Greenflight Venture Corporation et al.* v. *Whitepages, Inc. et.*, "Whitepages, Inc.'s Opposition to Defendants' Motion for Reconsideration," filed on Aug. 9, 2016.

3:16-cv-00175-RS *Greenflight Venture Corporation et al.* v. *Whitepages, Inc. et.*, "Defendant Whitepages, Inc.'s Notice of Motion and Motion for Judgment on the Pleadings of Invalidity under 35 USC 101," filed on May 23, 2016.

3:16-cv-00175-RS *Greenflight Venture Corporation et al.* v. *Whitepages, Inc. et.*, "Defendants Greenflight Venture Corporation and Jeffrey Isaacs' Opposition to Motion for Judgment on the Pleadings of Invalidity under 35 USC 101," filed on Jun. 6, 2016.

3:16-cv-00175-RS *Greenflight Venture Corporation et al.* v. *Whitepages, Inc. et.*, "Defendants' Notice of Motion and Motion for Leave to File Motion for Reconsideration," filed on Jul. 29, 2016.

* cited by examiner

FIG. 1A -Prior Art-
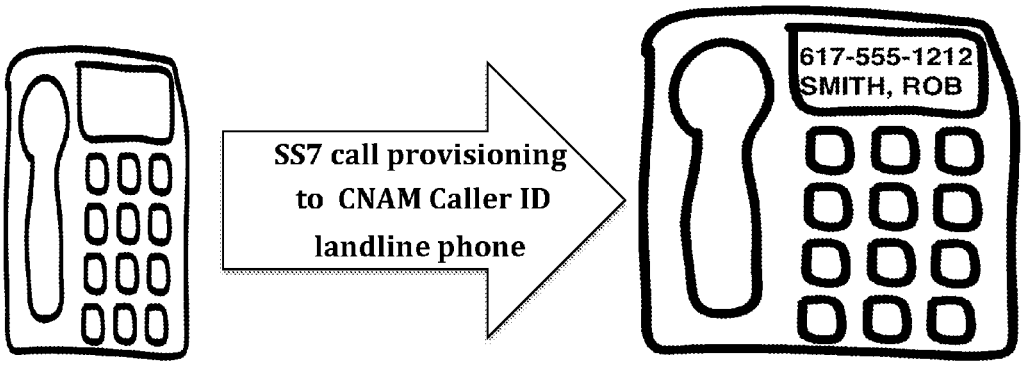
FIG. 1B -Prior Art-
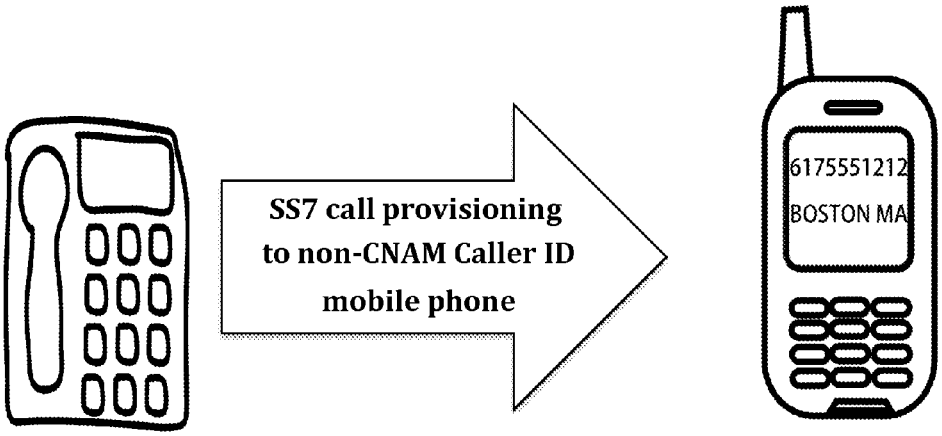
FIG. 1C -Prior Art-
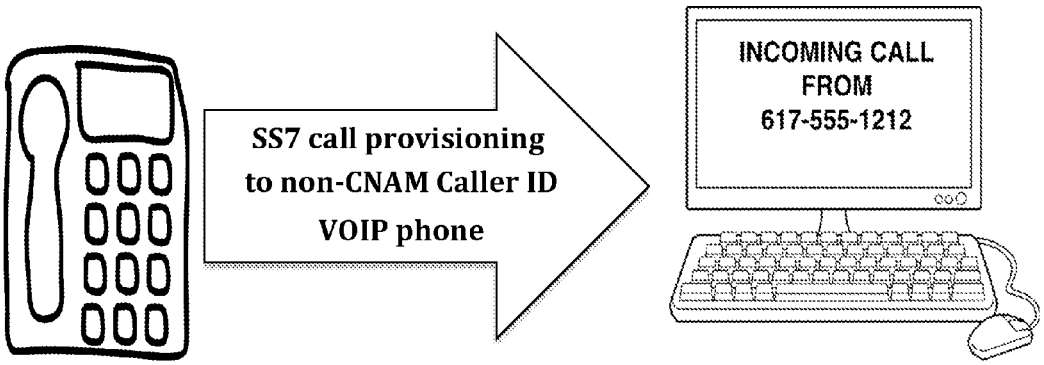

POST-PAGE CALLER NAME IDENTIFICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates generally to caller identification systems. More specifically, it relates to a post-page caller name identification system that bridges SS7 retrievable caller data with a user-accessible IP interface. Carrier implementation of caller name identification has become increasingly complicated due to the fragmentation of service providers on the North American Public-Switched Telephone Network (PSTN). The present invention restores functionality of this important SS7/PSTN capability, caller name identification, to the increasing number of telecommunications end-users left without this feature.

2. Description of the Prior Art

To place a call using the earliest long-distance telephone systems, a calling party initiated a request with the local switchboard operator. The calling party's local operator would connect to the inward operator, and specify the called party. The inward operator would identify the calling party to the called party, then coordinate the completed telephone circuit with the originating local operator.

Direct dial systems using automated protocols over the Public Switched Telephone Network eventually phased out the operator switchboard system by the 1960's. Unlike the system utilizing human operators, the direct dial networks did not readily identify the calling party to the called party. The relative anonymity of automated PSTN systems created both inconvenience and the potential for abuse. The invention of what became known as caller identification addressed these shortfalls. Between 1969 and 1975, Mr. Theodore Paraskevakos successfully claimed twenty separate patents related to automatic telephone line identification. By 1989, Bell Atlantic, BellSouth, and U.S. West Communications had implemented caller identification in their consumer service offerings.

Caller identification, or Caller ID, may colloquially refer to the presentation of either the calling party's telephone number, or name, to the called party. The initial caller identification systems transmitted only the calling party's phone number to the called party. By their rollout in the late 1980's, or shortly thereafter, the "Baby Bell" Caller ID service offerings typically included both CID and CNAM functionality. These services grew in popularity, with tens of millions of subscribers by the late 1990's. For this specification, caller identification, or CID, refers to the presentation of the calling party's phone number to the called party. Caller name identification, or CNAM Caller ID, shall refer to the presentation of the calling party's name to the called party.

The technical protocols for Caller ID evolved since Mr. Paraskevakos' invention, to what is now industry-standard implementation over the PSTN SS7 network. Despite the standardization of the protocol, telephone line portability deregulation significantly increased the complexity and cost of a CNAM Caller ID query. CNAM information previously held in a few databases of the Baby Bells increased to hundreds, if not thousands, of databases operated by the emerging telephone companies.

At the time of filing, a complete CID & CNAM Caller ID query typically involved the following steps: 1) the CID is transmitted from the calling party to the called party during SS7 call circuit provisioning (the network "page"), 2) a Global Title Translation (GTT) is initiated from the called party's SS7 signaling transfer point (STP) to determine which CNAM database and telephone carrier represents the calling party CID, 3) a GR-1188 CNAM query is relayed via SS7 to the service control point (SCP) for the respective CNAM database, and 4) the GR-1188 CNAM query result is presented to the called party. The exact sequence of events may vary depending upon the called and calling party's intercarrier agreements and SS7 implementation. Characteristic of the prior art implementations, the entire sequence of events takes place during the ringing or network page, and prior to the call completion.

As mobile phones and voice-over-IP telephony (VOIP) proliferated over the past decade, many providers never implemented full CNAM Caller ID to their mobile or VOIP end-users. Those that did implement CNAM Caller ID usually charge a monthly fee for CNAM Caller ID. For example, a major American wireless carrier recently began offering "Caller Name ID" as a premium monthly feature. Furthermore, individuals now may own several phone numbers, including a home land-line, a personal cellular mobile, and a VOIP line at work. Subscribing to a monthly CNAM service on multiple lines, if the feature is even available, is costly. As a result, CNAM Caller ID prevalence is trending backwards.

SUMMARY OF THE INVENTION

In view of the foregoing limitations inherent in the known types of caller identification systems present in the prior art, the present invention provides a post-page caller name identification system. This standalone system may function for multiple telephone devices owned or operated by the end-user. The system is independent of the end-user's carrier implementation (or lack thereof) of CNAM Caller ID.

The utility of the present invention, which shall be described subsequently in greater detail, is to identify the calling party's name when only the CID is known. This is typically the case with most modern cellular mobile and VOIP systems. The present invention's post-page functionality complements the prior art. In an ideal telephony network, CNAM Caller ID would be transmitted during the page, or ring. As described above, CNAM implementation has been declining for a decade due to increasing complexity of carriers. This necessitates the present invention as the next-best solution for an end-user wishing to identify a calling party.

To attain this, the present invention comprises a system that interfaces the user directly with the calling party's SS7 SCP-connected CNAM database. After a call or page terminates, the user accesses the present invention via the user terminal, which may operate on a mobile phone application or via direct HTML web access. The user inputs the CID information relayed from the calling party to the end-user. The system then performs a Global Title Translation (GTT) query using its SS7 node. The GTT lookup returns the respective phone carrier and CNAM database applicable to the CID. The system then performs a GR-1188 CNAM query via SS7 to the service control point (SCP) for the respective CNAM database. Finally, the CNAM query result is presented on the user-interface.

By utilizing the present invention, the end-user consolidates CNAM services and enjoys significant cost savings. At time of filing, a commercial implementation of the present invention was offered free-of-charge to the user via either a smartphone applications or direct web access. As stated above, the CNAM functionality offered by the present invention is often unavailable, even as a premium service, on many VOIP and cellular carriers.

The calling party may opt-out from this process at three points. First, the calling party may opt-out from CID transmission on a per-call basis, which is typically known as "*67 Caller ID Block." Second, the calling party may inform his/her carrier to remove his information from their CNAM database. Third, the calling party may opt-out using a form implemented on the privacy policy page of the present invention.

BRIEF DESCRIPTION OF THE DRAWINGS

Features of the exemplary implementations of the invention will become apparent from the description, the claims, and the drawings in which:

FIG. 1 identified as subparts 1A, 1B, & 1C, represents three typical variations of the caller identification prior art;

DETAILED DESCRIPTION

From FIG. 1, three scenarios are identified which represent the current prior art of caller identification systems. Scenario 1A represents the ideal provisioning of a call where the called party receives both the name and phone number of the calling. In this case, the CID and CNAM are 617-555-1212 and "Smith, Robert," respectively. Scenario 1B, the middle illustration, only provides the calling party phone number. This scenario is typical of most cellular mobile carriers. In lieu of the CNAM, the cellular carrier will approximate the location of the calling party, although this is frequently subject to error. Scenario 1C, illustrated at the bottom of FIG. 1, depicts a typical VOIP caller identification presentation, which only includes the calling party number (CID).

Figure 2:
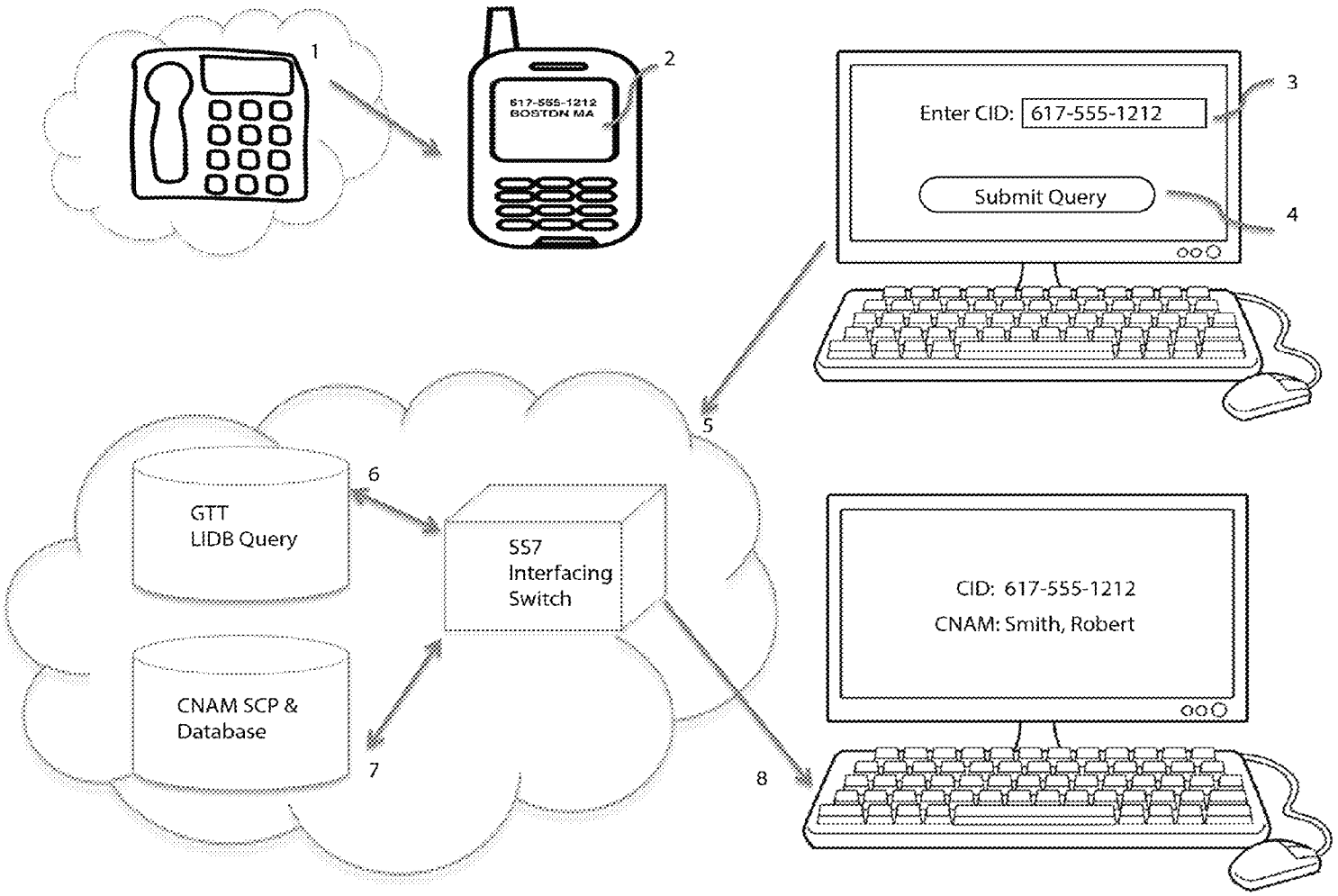
FIG. 2 is a graphical depiction of the core system components and their interactions.

Having understood the possible combinations of CID and/or CNAM presentations possible on a caller identification system, FIG. 2 embodies the components of the present invention utilized in the context of the scenario depicted in FIG. 1B. The calling party has placed a call (1) over the PSTN, and the carrier has provisioned for the CID and estimated location to be presented on the end-user's telephone screen (2) during the network page.

The end-user initiates use of the system by accessing the user terminal. The user enters the CID from (2) into the CID entry field (3) of the user terminal. After entering a valid CID, the user (4) submits the query to the system. The system then initiates the "CNAM database query" (5) via the SS7 network.

There exist several methodologies to obtain a CNAM database result via SS7, and the exact implementation depends upon the calling party's carrier, the system's carrier, and any contractual relationships between the two carriers. Exemplified in FIG. 2, and most typical, the system performs a Global Title Translation (6) using various Line Information Databases (LIDBs) to determine the calling party's carrier. In some cases, the system will already know the calling party's carrier (e.g. if they are the same as the called party), and this step will be unnecessary. Once the carrier is known, the system is able to route a CNAM query using GR-1188 (7) to the appropriate SS7 signal control point (SCP). The SCP controls CNAM database access for a given phone carrier. For the purposes of this invention, the entire process is referred to as "CNAM Database Query" (5) and refers to any of the proper SS7 methods to retrieve CNAM information.

Upon successful CNAM database query, the CNAM Caller ID is relayed back to the user terminal. The caller name identification is displayed on the appropriate user interface element, thereby completing the process.

Figure 3:
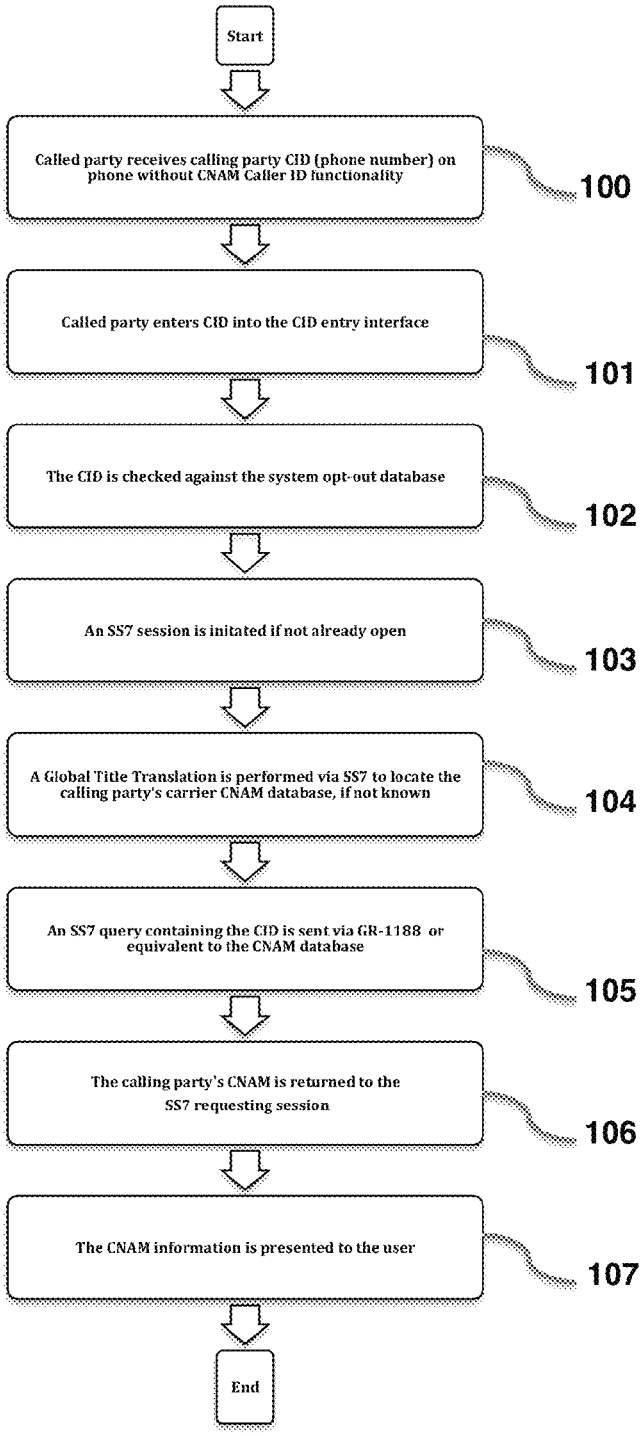
FIG. 3 is a flow diagram enumerating each possible step the system performs to process a user query for caller name identification.

FIG. 3 serves as a flow diagram enumerating all possible steps for the system, as embodied, to carry out its function. The utilization of this system commences upon end-user receipt of a CID page (100). The user then activates the system by entering the page CID into the CID entry interface (101). Before the system proceeds, it first validates that the CID is not listed within the system's opt-out privacy database (102). At this stage, the system may also ask the user to confirm the CID had been transmitted to a telephone device they own or operate.

The system then instructs the SS7 interfacing node to initiate an SS7 session, if one is not already active (103). The exact state or instructions relayed to the SS7 switch/node varies depending upon carrier implementation. Once the SS7 session is active, a Global Title Translation (GTT) is performed using the CID from the CID entry interface. (104). The GTT returns the calling party carrier information necessary to locate the carrier's CNAM database on the SS7 network. A query is thereafter sent, usually via the GR-1188 protocol, to the signal control point (SCP) for the calling carrier CNAM database (105). Assuming the calling party didn't opt-out from its carrier CNAM database, the calling party's CNAM is returned to the system's SS7 node (106). Then, the CNAM database query result is displayed on the user interface (107).

Figure 4:
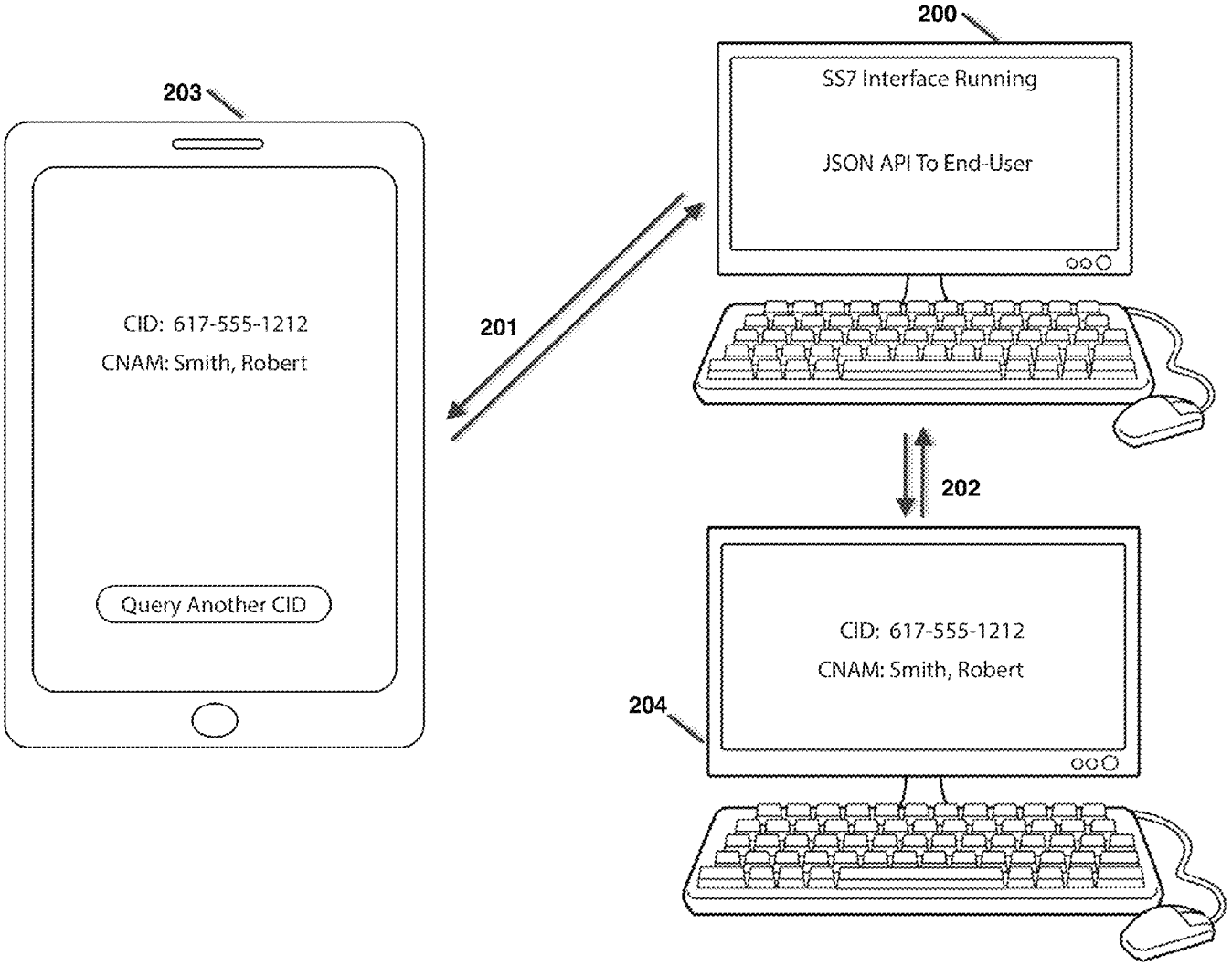
FIG. 4 depicts two additional embodiments of the user interface.

FIG. 4 depicts additional embodiments of the system relating to its user interface. In this illustration, the system's SS7 interface (200) is physically separated from its user interface. The user interface is implemented on either another computer linked via the TCP/IP (204), or the end-user's telephone that received the initial call page (203). The SS7 interface communicates (201 or 202) with the user interface via an industry standard API protocol such as JSON.

I claim:

[1. A system, functioning independently of a called party's telephone carrier and device, provides a calling party's CNAM after entry of the calling party's telephone number CID, comprising:

a) an entry field, within a HTML web or mobile phone application, permitting the called party to input a query, post-page, specifying the CID;

b) an SS7 interfacing node permitting real-time access to the SS7 network;

c) a function serving as a direct interface between the called party's query and the calling party carrier's respective CNAM database;

d) within the HTML web or mobile phone application, a display of the successfully queried calling party CNAM.]

[2. The system of claim 1, wherein the web or mobile phone application provides free-of-charge CNAM resolution for any of the end-user's multiple telephony devices, thereby permitting cost-savings.]

[3. The system of claim 1, wherein the called party enjoys significant cost savings and free-of-charge CNAM querying through an advertising display within the user interface.]

[4. The system of claim 1, wherein component function (c) additionally:

confirms that the CID is not subject to system opt-out privacy controls; and confirms that the CID paged a telephonic device owned or operated by the called party.]

[5. A method for providing a called party with the calling party's CNAM after a network page, independent of interaction with the carrier or device receiving the page, comprising the following steps:

a) entering of the calling party's telephone number CID into a web HTML or mobile phone application query field;

b) connecting to the PSTN via an SS7 interfacing node;

c) directly querying the calling party carrier CNAM database with the CID query entry;

d) displaying the successfully queried calling party CNAM on the HTML web or mobile phone application user interface.]

[6. The method of claim 5, further comprising a step to display advertising sponsorship on the web or mobile phone application interface, thereby achieving significant user cost savings and free-of-charge CNAM querying.]

*7. An SS7 interfacing node connected to both a TCP/IP network and an SS7 communication network, comprising:*

*a TCP/IP network interface configured to provide a connection to a user terminal, the connection being configurable over an application program interface (API) using an industry standard protocol; and*

*an SS7 communication network interface configured to communicate with signal control points (SCPs) on the SS7 communication network;*

*wherein the SS7 interfacing node is configured (a) to receive from the user terminal over the TCP/IP network interface a query of a caller name identification (CNAM) database for a CNAM based on a telephone number obtained from a paging signal of an SS7 call, (b) to transmit the telephone number in a carrier identity request over the SS7 communication network interface to one or more line information databases (LIDBs); (c) to receive a carrier identity from the LIDBs over the SS7 communication network interface; (d) based on the carrier identity, to forward the query using GR-1188 to one or more CNAM databases over the SS7 communication network interface, (e) over the SS7 communication network interface, to receive from the CNAM databases a CNAM associated with the telephone number; and (f) over the TCP/IP network interface, to provide the received CNAM as the calling party's name to the user terminal.*

*8. The SS7 interfacing node of claim 7, wherein the industry standard protocol comprises JSON.*

*9. A method in an SS7 interfacing node connected to both a TCP/IP network and an SS7 telecommunication network, comprising:*

*configuring a TCP/IP network interface with a user terminal using an application program interface (API) that conforms to an industry standard protocol; and*

*configuring an SS7 communication network interface that communicates with one or more line information databases (LIDBs) and one or more SS7 signal control points (SCPs) over the SS7 communication network;*

*wherein the SS7 interfacing node (a) receives from the user terminal over the TCP/IP network interface a query of a caller name identification (CNAM) database for a CNAM based on a telephone number obtained from a paging signal of an SS7 call, (b) transmits the telephone number in a carrier identity request over the SS7 communication network interface to one or more line information databases (LIDBs); (c) receives a carrier identity from the LIDBs over the SS7 communication network interface; (d) based on the carrier identity, forwards the query using GR-1188 to one or more CNAM databases over the SS7 communication network interface, (e) over the SS7 communication network interface, receives from the CNAM databases a CNAM associated with the telephone number; and (f) over the TCP/IP network interface, provides the received CNAM as the calling party's name to the user terminal.*

*10. The method of claim 9, wherein the industry standard protocol comprises JSON.*

* * * * *